(12) United States Patent
Paul et al.

(10) Patent No.: US 11,487,289 B1
(45) Date of Patent: *Nov. 1, 2022

(54) AUTONOMOUS VEHICLE REPAIR

(71) Applicant: United Services Automobile Association (USAA), San Antonio, TX (US)

(72) Inventors: Cameron Paul, Live Oak, TX (US); Paul Joseph Craig, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/014,779

(22) Filed: Sep. 8, 2020

Related U.S. Application Data (63) Continuation of application No. 16/173,886, filed on Oct. 29, 2018, now Pat. No. 10,802,486.

(60) Provisional application No. 62/579,988, filed on Nov. 1, 2017.

(51) Int. Cl.
*G05D 1/00* (2006.01)
*H04L 67/12* (2022.01)
*G07C 5/00* (2006.01)

(52) U.S. Cl.
CPC ........... *G05D 1/0088* (2013.01); *G07C 5/006* (2013.01); *H04L 67/12* (2013.01)

(58) Field of Classification Search
CPC ....... G05D 1/0088; G07C 5/006; H04L 67/12

USPC .......................................................... 701/23
See application file for complete search history.

(56) References Cited

U.S. PATENT DOCUMENTS

| | | | |
|---|---|---|---|
| 6,370,454 B1 | 4/2002 | Moore et al. | |
| 9,792,656 B1 * | 10/2017 | Konrardy | G07C 5/0816 |
| 10,086,782 B1 * | 10/2018 | Konrardy | B60L 53/36 |
| 10,166,994 B1 * | 1/2019 | Fields | A61B 5/4094 |
| 10,802,486 B1 * | 10/2020 | Paul | H04L 67/12 |
| 2006/0287783 A1 * | 12/2006 | Walker | H04Q 9/00 701/31.4 |
| 2007/0087756 A1 | 4/2007 | Hoffberg | |
| 2008/0172258 A1 | 7/2008 | Weger et al. | |
| 2013/0145482 A1 | 6/2013 | Ricci et al. | |
| 2014/0136259 A1 | 5/2014 | Kinsey et al. | |
| 2014/0195102 A1 | 7/2014 | Nathanson | |
| 2014/0309849 A1 * | 10/2014 | Ricci | G06F 21/31 701/33.4 |
| 2014/0310031 A1 | 10/2014 | Ricci et al. | |
| 2015/0109104 A1 | 4/2015 | Fadell et al. | |
| 2015/0235480 A1 * | 8/2015 | Cudak | G05D 1/0297 701/2 |
| 2015/0302667 A1 * | 10/2015 | Punjabi | G07C 5/008 701/31.4 |
| 2015/0348335 A1 * | 12/2015 | Ramanujam | G06Q 10/00 701/23 |

(Continued)

*Primary Examiner* — Atul Trivedi
(74) *Attorney, Agent, or Firm* — Fish & Richardson P.C.

(57) ABSTRACT

Techniques are described for repairing an autonomous vehicle. One of the methods includes receiving a message that an autonomous vehicle requires repair, the message including a time period during which the autonomous vehicle is available for repair. The method includes scheduling a time for the repair with a third-party, the third party having an address. The method also includes directing the autonomous vehicle to autonomously drive to the address at the time.

15 Claims, 4 Drawing Sheets

(56) References Cited

U.S. PATENT DOCUMENTS

| | | |
|---|---|---|
| 2015/0371153 A1* | 12/2015 | Lohmeier .............. G06Q 40/08 |
| | | 705/5 |
| 2016/0203649 A1* | 7/2016 | Berkobin ........... G06Q 30/0609 |
| | | 705/13 |
| 2017/0053460 A1 | 2/2017 | Hauser et al. |
| 2017/0123421 A1* | 5/2017 | Kentley ................. G06Q 10/00 |
| 2017/0139411 A1* | 5/2017 | Hartung ................. H04L 12/40 |
| 2017/0139412 A1* | 5/2017 | Keohane .............. G05D 1/0088 |
| 2017/0148102 A1* | 5/2017 | Franke ................. G06K 9/6267 |
| 2017/0169625 A1* | 6/2017 | Lavie ................... G08G 1/0141 |
| 2017/0243485 A1 | 8/2017 | Rubin et al. |
| 2017/0293950 A1 | 10/2017 | Rathod |
| 2017/0371608 A1 | 12/2017 | Wasserman |
| 2018/0308295 A1 | 10/2018 | Kwak |
| 2019/0197497 A1* | 6/2019 | Abari ................... G05D 1/0088 |
| 2019/0279447 A1* | 9/2019 | Ricci ................... G06Q 20/145 |

\* cited by examiner

AUTONOMOUS VEHICLE REPAIR

CROSS-REFERENCE TO RELATED APPLICATION

This application is a continuation application of and claims priority under 35 U.S.C. § 120 to U.S. application Ser. No. 16/173,886, filed on Oct. 29, 2018, which claims priority under 35 U.S.C. § 119 to U.S. Application Ser. No. 62/579,988, filed on Nov. 1, 2017, and entitled "Autonomous Vehicle Repair," the entire contents of each of which are incorporated herein by reference.

BACKGROUND

An autonomous vehicle is a vehicle that is capable of sensing its environment and navigating without human input. Autonomous cars use a variety of techniques to detect their surroundings, such as radar, laser light, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination.

SUMMARY

Implementations of the present disclosure are generally directed at repairing an autonomous vehicle.

In general, innovative aspects of the subject matter described in this specification can be embodied in methods that include the act of receiving a message that an autonomous vehicle requires repair, the message including a time period during which the autonomous vehicle is available for repair. The methods include the act of scheduling a time for the repair with a third-party, the third party having an address. The methods also include the act of directing the autonomous vehicle to autonomously drive to the address at the time.

Implementations can optionally include one or more of the following features. The methods may include the act of scheduling an estimate during the period and directing the autonomous vehicle to autonomously drive to a location for the estimate. The methods may include the act of directing the autonomous vehicle to return to an initial location once the repair is complete. The message may be received from a voice activated smart device.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

An autonomous vehicle (also referred to as a self-driving vehicle) is a vehicle that is capable of sensing its environment and navigating without human input. Autonomous cars use a variety of techniques to detect their surroundings. Advanced control systems interpret sensory information to identify appropriate navigation paths, as well as obstacles and relevant signage. Autonomous cars have control systems that are capable of analyzing sensory data to distinguish between different cars on the road.

Autonomous vehicles generally use Bayesian Simultaneous localization and mapping algorithms, which fuse data from multiple sensors and an off-line map into current location estimates and map updates. Simpler systems may use roadside real-time locating system (RTLS) beacon systems to aid localization. Typical sensors include LIDAR and stereo vision, GPS and inertial measuring units (IMU). Visual object recognition uses machine vision including neural networks.

However, autonomous vehicles are not immune to accidents. For example, GOOGLE's self-driving automobile has 12 collisions as of 2015, or approximately one accident every 85,000 miles. The auto claim process to repair vehicles is a large inconvenience. Even in repairing minor damages, the vehicle owner will be without their vehicle and forced to spend valuable time organizing the claim and repairs.

Figure 1:
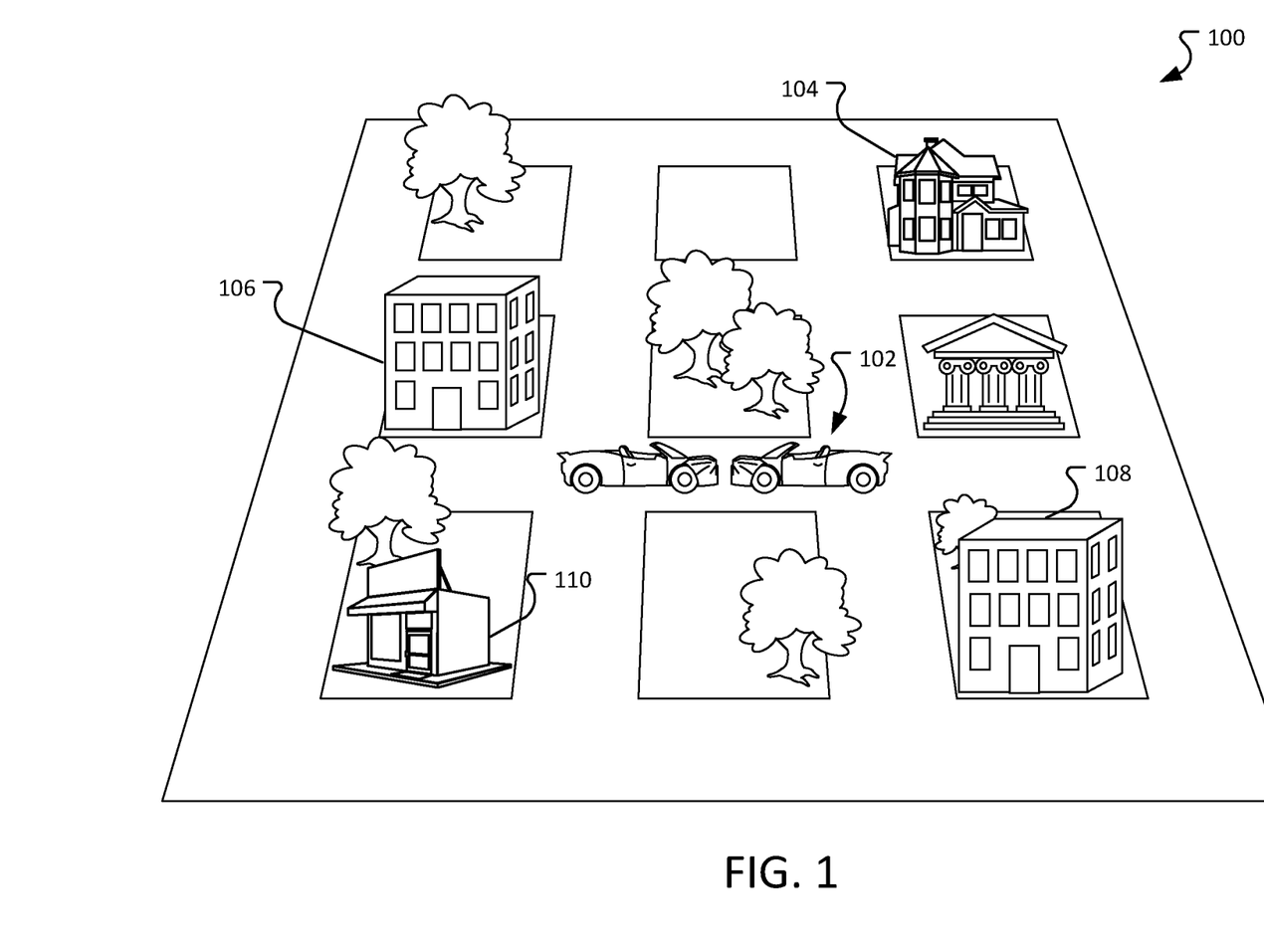
FIG. 1 depicts an example system for determining metric(s) for service session(s), according to implementations of the present disclosure.

FIG. 1 is a stylized map 100 illustrating an accident and the process of repairing an autonomous vehicle after the accident. A vehicle owner may live in one location (represented by the house 104) and work at another (represented by the building 108). The vehicle owner may use the vehicle to travel to and from work. When an accident occurs (represented by accident 102) the needs of the individual to travel between work and home has not diminished. Further, the vehicle owner now has additional tasks that need to be accomplished. For example, the vehicle owner may need to take the vehicle to an auto shop 110 and may even need to take the vehicle to a separate location for an appraisal (represented by the office 106).

Getting these necessary tasks performed could represent a substantial burden on the vehicle owner. Even in repairing minor damages, the vehicle owner can be without their vehicle and forced to spend valuable time organizing the claim and repairs. However, with the advent of autonomous vehicles, a vehicle owner may work with an insurance company to schedule times when the autonomous vehicle may deliver itself to the appraiser and repair shop at a time that is not an inconvenience to the vehicle owner.

The system can include using in-vehicle voice assistants (such as FORD'S SYNC), and in-home voice assistants (such as the AMAZON ECHO), to enable the vehicle owner to initiate an auto claim from the voice assistant and schedule a window that would be most convenient for them to be without their vehicle. The user may also receive notifications about the processing of the claim and the repair of the vehicle using the voice assistant.

The insurance company or another responsible party can coordinate with the car's artificial intelligence system to complete the remainder of the claim with no further interaction required from the vehicle owner. For example, the vehicle could drive itself to an approved shop for a negotiated repairs estimate, get the repairs completed, and return itself to the vehicle owner's location.

Updates, notifications, and status can also be pushed to the vehicle owner using SMS messages and/or push notifications through an application provided by the insurance company, automobile company, repair shop or other entity.

Figure 2:
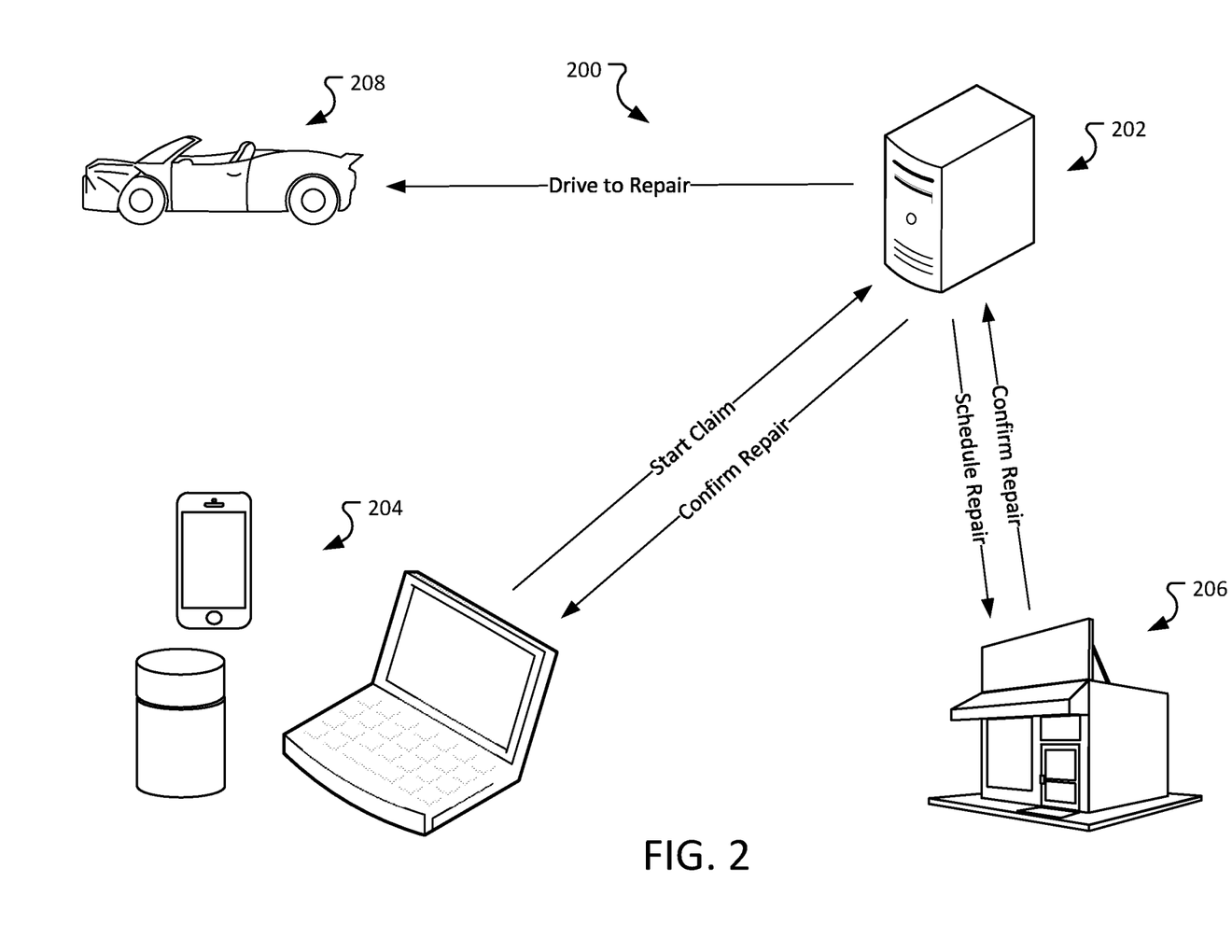
FIG. 2 illustrates an example of an environment for autonomous vehicle repair.

FIG. 2 illustrates an example of an environment for autonomous vehicle repair. The user can tell the system to start a claim. The user can start the claim process, for example, by using a voice recognition system, such as the AMAZON ECHO, through an application on a mobile device, or a computer device (collectively user devices 204) to contact an insurance company 202. Generally, reference to the insurance company can include servers and other computer systems under the control of the insurance company.

In some implementations, the insurance company 202 may request diagnostic information from the vehicle 208, for example, to determine if the vehicle is capable of driving itself to be repaired. For example, a server at the insurance company may send an electronic message to the automobile requesting the diagnostic information. The message may be sent over a network, for example, over a cellular network and/or over the Internet.

The insurance company 202 may receive scheduling information from one or more of the user devices 204. The scheduling information can dictate when the vehicle is available to be examined and repaired, for example, while the user is at work, or in class, or at a movie, etc. In some implementations, the vehicle may provide information about the hours when the vehicle is generally idle. The insurance company 202 may then confirm that period of time with the user.

The insurance company 202 communicates with a repair shop 206. In some implementations, the insurance company 202 may communicate with a computer system at the repair shop 202. In some implementations, an individual at the insurance company may call the repair shop and schedule the visit manually.

The insurance company 202 and the repair shop 206 schedule time for the estimate and/or repair to be performed within the period that the user has indicated that the vehicle is available. Once the repair is scheduled, the insurance company 202 contacts the user (for example, by sending a message or push notification to the user device 204) and allows the user to confirm/approve the appointment time.

At the time of the appointment, the insurance company 202 sends a message to the autonomous vehicle 208 and tells the vehicle to drive to the repair shop 206. Repairing the vehicle may result in some costs that are the responsibility of the vehicle owner. Instead of the insurance company 202, the automobile repair shop may contact the owner to approve the repair (either directly or through the insurance company 202). In some implementations, the owner of the vehicle may have pre-approved repairs to the vehicle up to an amount, for example, a deductible.

After the repair is complete, the repair company 206 or the insurance company 202 sends a message that tells the vehicle 208 to return to the user's location (or the location where the vehicle was at the time it drove to the repair.).

In some implementations, the user may tell the insurance company 202 where the vehicle should go upon completion of the repairs.

Figure 3:
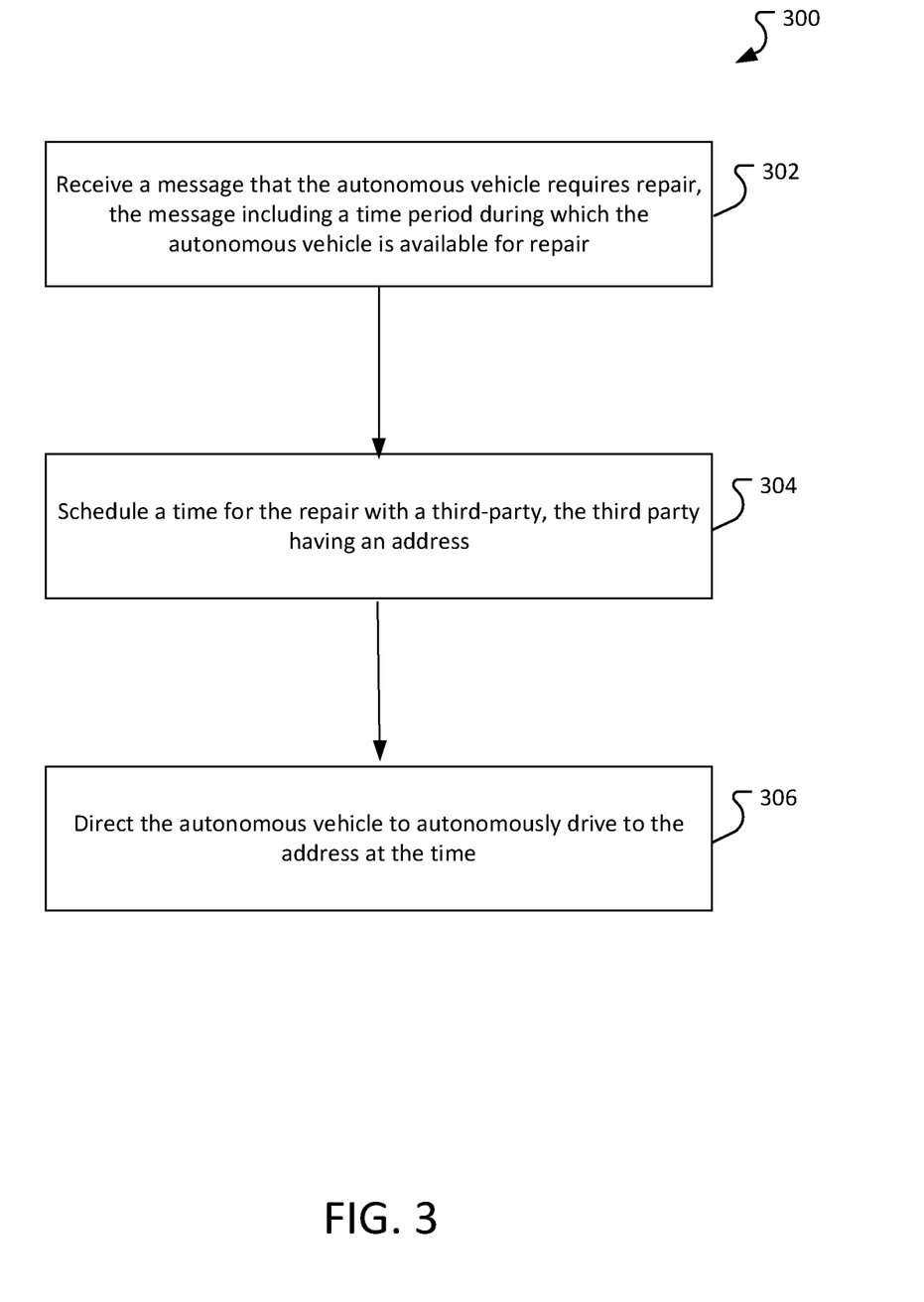
FIG. 3 is a flowchart of an example process for repairing an autonomous vehicle.

FIG. 3 is a flowchart of an example process for repairing an autonomous vehicle. The process can be performed by a server in conjunction with an autonomous vehicle.

The process 300 receives 302 a message that the autonomous vehicle requires repair, the message including a time period during which the autonomous vehicle is available for repair. The message may include all of the details in an initial message. In some implementations, one or more details may be left out of the initial contact, for example, the owner may indicate that a vehicle needs repair, but may not specify which vehicle requires repair or when the vehicle is available to be repaired. The system may interact with the user through one or more communication sessions to establish the vehicle and when it is available.

The process 300 schedules 304 a time for the repair with a third-party, the third party having an address. The process may include contacting a body shop, a repair shop, a mechanic, or another third party capable of performing necessary repairs on the vehicle. In some implementations, the determination of the third-party to contact may be determined, at least in part, on diagnostic information provided by the autonomous vehicle.

The process 300 directs 306 the autonomous vehicle to autonomously drive to the address at the time. As used herein, autonomously drive indicates that the vehicle moves from its initial location to the address of the third party without requiring a human operator to drive the vehicle. As described above, once repairs are complete, the autonomous vehicle may be instructed to return to its initial location or a location specified by the owner.

Figure 4:
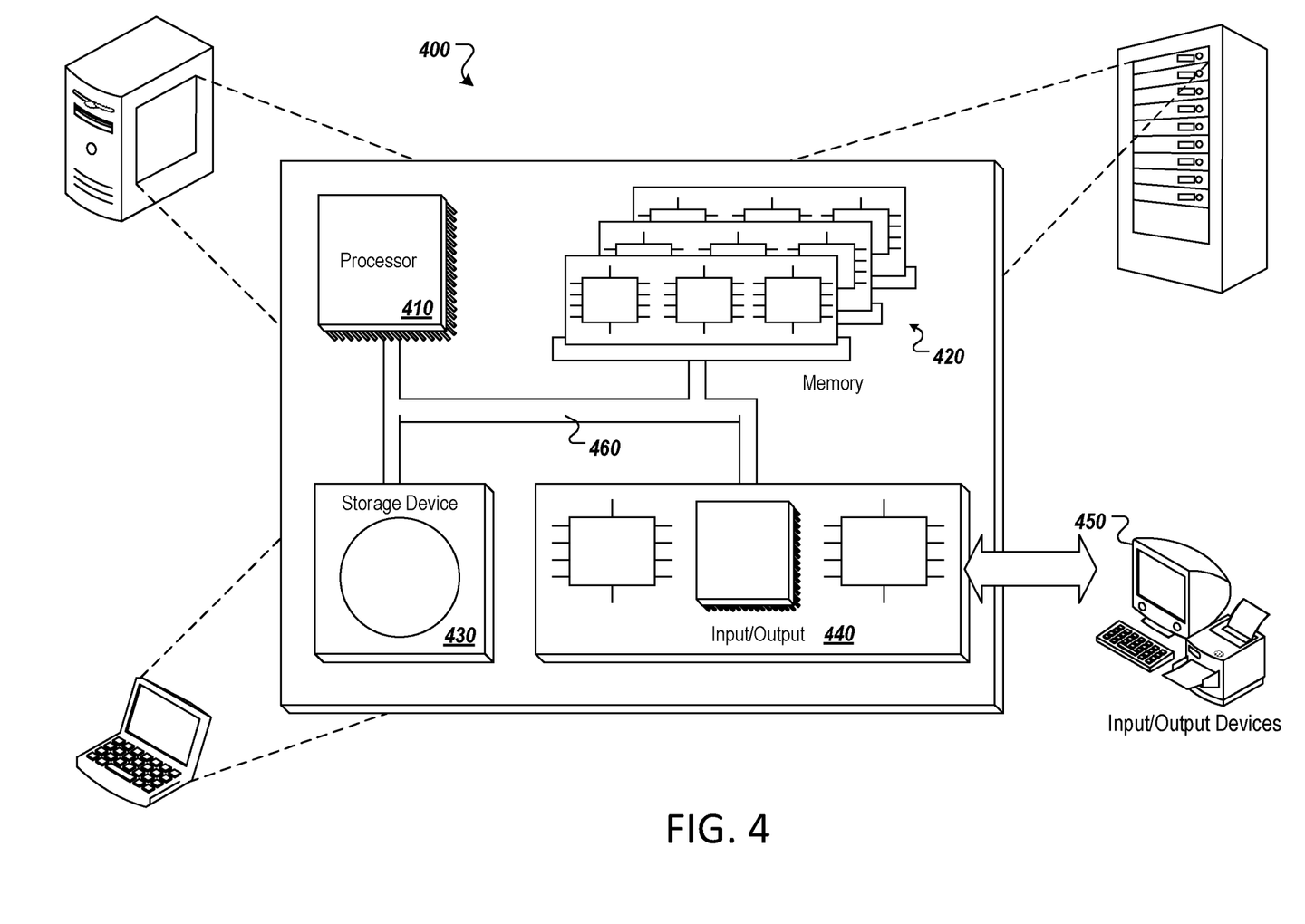
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
an autonomous vehicle capable of autonomously driving to a location without human intervention;
a server comprising:
at least one processor; and
a memory communicatively coupled to the at least one processor, the memory storing instructions which, when executed by the at least one processor, cause the at least one processor to perform operations comprising:
receiving, from an in-vehicle or an in-home voice assistant device, a message from an owner of the autonomous vehicle, the message indicating that the autonomous vehicle requires repair;
in response to receiving a message, initiating an auto insurance claim for repairing the autonomous vehicle;
receiving, from the autonomous vehicle, diagnostic information of the autonomous vehicle;
determining a third-party capable of performing the repair on the autonomous vehicle based on the diagnostic information, the third party having an address;
directing the autonomous vehicle to autonomously drive to the address for the repair on the autonomous vehicle; and
completing the auto insurance claim without interacting with the owner of the autonomous vehicle.

2. The system of claim 1, wherein the operations further comprise scheduling a repair estimate and directing the autonomous vehicle to autonomously drive to a location for the repair estimate.

3. The system of claim 1, wherein the operations further comprise directing the autonomous vehicle to return to an initial location once the repair is complete.

4. The system of claim 1, wherein the message is received from a voice activated smart device.

5. The system of claim 1, wherein the operations further comprise: scheduling a time for the repair with the third party and directing the autonomous vehicle to autonomously drive to the address at the schedule time for the repair.

6. A computer-implemented method comprising:
receiving, from an in-vehicle or an in-home voice assistant device, a message from an owner of the autonomous vehicle, the message indicating that the autonomous vehicle requires repair;
in response to receiving a message, initiating an auto insurance claim for repairing the autonomous vehicle;
receiving, from the autonomous vehicle, diagnostic information of the autonomous vehicle;
determining a third-party capable of performing the repair on the autonomous vehicle based on the diagnostic information, the third party having an address;
directing the autonomous vehicle to autonomously drive to the address for the repair on the autonomous vehicle; and
completing the auto insurance claim without interacting with the owner of the autonomous vehicle.

7. The computer-implemented method of claim 6, further comprising scheduling an estimate and directing the autonomous vehicle to autonomously drive to a location for the estimate.

8. The computer-implemented method of claim 6, further comprising directing the autonomous vehicle to return to an initial location once the repair is complete.

9. The computer-implemented method of claim 6, wherein the message is received from a voice activated smart device.

10. The computer-implemented method of claim 6, further comprising: scheduling a time for the repair with the third party and directing the autonomous vehicle to autonomously drive to the address at the schedule time for the repair.

11. A non-transitory computer-readable medium storing instructions which, when executed by at least one processor, cause the at least one processor to perform operations comprising:
receiving, from an in-vehicle or an in-home voice assistant device, a message from an owner of the autonomous vehicle, the message indicating that the autonomous vehicle requires repair;
in response to receiving a message, initiating an auto insurance claim for repairing the autonomous vehicle;
receiving, from the autonomous vehicle, diagnostic information of the autonomous vehicle;
determining a third-party capable of performing the repair on the autonomous vehicle based on the diagnostic information, the third party having an address;
directing the autonomous vehicle to autonomously drive to the address for the repair on the autonomous vehicle; and
completing the auto insurance claim without interacting with the owner of the autonomous vehicle.

12. The non-transitory computer-readable medium of claim 11, wherein the operations further comprise scheduling an estimate and directing the autonomous vehicle to autonomously drive to a location for the estimate.

13. The non-transitory computer-readable medium of claim 11, wherein the operations further comprise directing the autonomous vehicle to return to an initial location once the repair is complete.

14. The non-transitory computer-readable medium of claim 11, wherein the message is received from a voice activated smart device.

15. The non-transitory computer-readable medium of claim 11, wherein the operations further comprise: scheduling a time for the repair with the third party and directing the autonomous vehicle to autonomously drive to the address at the schedule time for the repair.

* * * * *